(12) United States Patent　　(10) Patent No.: US 11,486,584 B2
Jones　　(45) Date of Patent: Nov. 1, 2022

(54) HEATING AND VENTILATION SYSTEM

(71) Applicant: Joan Philomena Jones, West Sussex (GB)

(72) Inventor: David Jones, West Sussex (GB)

( * ) Notice: Subject to any disclaimer, the term of this patent is extended or adjusted under 35 U.S.C. 154(b) by 0 days.

(21) Appl. No.: 16/076,663

(22) PCT Filed: Apr. 25, 2017

(86) PCT No.: PCT/GB2017/000062
§ 371 (c)(1),
(2) Date: Aug. 8, 2018

(87) PCT Pub. No.: WO2017/187118
PCT Pub. Date: Nov. 2, 2017

(65) Prior Publication Data
US 2019/0049121 A1　　Feb. 14, 2019

(30) Foreign Application Priority Data
Apr. 25, 2016　(GB) ..................... 1607134

(51) Int. Cl.
*F24D 5/08*　　(2006.01)
*F28F 13/12*　　(2006.01)
(Continued)

(52) U.S. Cl.
CPC ............. *F24D 5/08* (2013.01); *F23D 14/151* (2021.05); *F24D 19/0087* (2013.01);
(Continued)

(58) Field of Classification Search
CPC ................................. A01K 1/0046; A01K 1/76
(Continued)

(56) References Cited

U.S. PATENT DOCUMENTS 4,524,722 A * 6/1985 Siccardi ................. A01K 31/22
119/448
4,602,739 A * 7/1986 Sutton, Jr. ............ A01K 1/0047
165/267
(Continued)

FOREIGN PATENT DOCUMENTS

DE　　3521700 C1　　2/1986
EP　　0067979 A1　　12/1982
(Continued)

OTHER PUBLICATIONS

DE_3521700_translate.pdf—English machine translation of German Patent.*
(Continued)

*Primary Examiner* — Steven B McAllister
*Assistant Examiner* — John E Bargero
(74) *Attorney, Agent, or Firm* — Schmeiser, Olsen & Watts LLP

(57) ABSTRACT

Apparatus and method of heating and ventilating an enclosed area comprising a floor arranged as a number of floor zones. The method comprises providing a radiant heater spaced above each floor zone so as in use to direct heat downwards towards the floor; providing a ventilating air inlet spaced above at least part of each floor zone, the air inlet being at the same level as, or closer to, the floor than the radiant heater, the air inlet being arranged in use to draw-in a controllable quantity of air from outside of the enclosed area; providing a ventilating air outlet spaced above at least part of each floor zone, the air outlet being spaced further from the floor than the radiant heater and air inlet, the air outlet being arranged in use to extract a controllable quantity of air from inside of the enclosed area, wherein the method further comprises, for each floor zone, independently controlling the quantity of air being drawn in
(Continued)

and extracted from said floor zone based on the sensed temperature inside and outside the enclosed space.

7 Claims, 19 Drawing Sheets

(51) Int. Cl.
| | | |
|---|---|---|
| F24F 11/74 | (2018.01) | |
| F24F 11/76 | (2018.01) | |
| F23D 14/12 | (2006.01) | |
| F24F 11/65 | (2018.01) | |
| F24D 19/00 | (2006.01) | |
| F24D 19/02 | (2006.01) | |
| F24D 19/10 | (2006.01) | |
| F24F 11/00 | (2018.01) | |

(52) U.S. Cl.
CPC ......... *F24D 19/0203* (2013.01); *F24D 19/10* (2013.01); *F24F 11/0001* (2013.01); *F24F 11/65* (2018.01); *F24F 11/74* (2018.01); *F24F 11/76* (2018.01); *F28F 13/12* (2013.01); *F24D 19/1084* (2013.01); *F24D 2220/042* (2013.01); *F24F 2011/0002* (2013.01)

(58) Field of Classification Search
USPC ........................................................ 237/2 A
See application file for complete search history.

(56) References Cited

U.S. PATENT DOCUMENTS

| | | | |
|---|---|---|---|
| 6,374,623 B1* | 4/2002 | Gubbels ............... | A01K 1/0047 62/176.6 |
| 7,654,257 B2* | 2/2010 | Vancak ................. | F23C 3/002 126/91 A |
| 9,303,880 B1 | 4/2016 | Tomlinson et al. | |
| 2006/0186213 A1 | 8/2006 | Carey et al. | |
| 2015/0219382 A1 | 8/2015 | Uselton | |
| 2016/0227726 A1* | 8/2016 | Priest ................... | F04D 25/166 |

FOREIGN PATENT DOCUMENTS

| | | |
|---|---|---|
| GB | 2549544 B | 2/2021 |
| JP | 2011075133 A | 4/2011 |

OTHER PUBLICATIONS

International Search Report and Written Opinion, dated Jul. 31, 2017, for PCT/GB2017/000062, 9 pages.
UK Intellectual Property Office Search Report, dated Aug. 1, 2017, for GB1607134.2, 4 pages.

* cited by examiner

HEATING AND VENTILATION SYSTEM

FIELD OF THE INVENTION

This invention relates to a heating and ventilation system, particularly, though not exclusively, employing a radiant tube heater.

BACKGROUND OF THE INVENTION

Systems for heating and ventilating large enclosed spaces, e.g. warehouses, factories and/or aircraft hangars, do not generally provide comfortable working conditions for those working within them, and also tend to be highly inefficient. The large working area which can be as large as, but not limited to, 30,000 m² and also may have high roof levels use simple control systems that together provide both poor heating and ventilation, often resulting in working areas being too hot in summer conditions, too cold in winter conditions, with draughts circulating.

In terms of heating, hot water heaters, gas heaters, oil heaters, condensing unit heaters and destratification heaters are often used, but tend to be highly inefficient in terms of the amount of primary energy needed to provide required heat at the ground level where people are working. Further, warm air can rapidly escape from the space if a door, window or hangar door is opened.

Radiant tube heaters tend to be more efficient, a higher proportion of primary energy being converted to heat at or near the ground level. The heat generated tends to radiate primarily to areas beneath the heater.

Ventilation is needed in enclosed spaces to remove pollutants such as potentially harmful gases and particulates, replacing dirty air with fresh air from the outside environment. Known ventilation systems tend to comprise air inlets and extractors the speed/capacity of which is manually selected. Therefore, in a large space, where many ventilation units are present, many such units may be running at a given time, even though a large proportion of the air is actually clean. Conversely, where pollutants are present in high levels, there may be no ventilation.

There is a need for an improved heating and ventilation method and system, providing more comfort for users within the space and with energy efficient operation.

SUMMARY OF THE INVENTION

A first aspect of the invention provides a method of heating and ventilating an enclosed area comprising a floor arranged as a number of floor zones, the method comprising:
providing a radiant heater spaced above each floor zone so as in use to direct heat downwards towards the floor;
providing a ventilating air inlet spaced above at least part of each floor zone, the air inlet being at the same level as, or closer to, the floor than the radiant heater, the air inlet being arranged in use to draw-in a controllable quantity of air from outside of the enclosed area;
providing a ventilating air outlet spaced above at least part of each floor zone, the air outlet being spaced further from the floor than the radiant heater and air inlet, the air outlet being arranged in use to extract a controllable quantity of air from inside of the enclosed area,
wherein the method further comprises, for each floor zone, independently controlling the quantity of air being drawn in and extracted from said floor zone based on the sensed temperature inside and outside the enclosed space.

A second aspect of the invention provides apparatus for controlling heating and ventilation of an enclosed area comprising a plurality of floor zones, the apparatus comprising:
for each floor zone:
a radiant heater spaced above each floor zone so as in use to direct heat downwards towards the floor;
a ventilating air inlet spaced above at least part of each floor zone, the air inlet being at the same level as, or closer to, the floor than the radiant heater, the air inlet being arranged in use to draw-in a controllable quantity of air from outside of the enclosed area;
a ventilating air outlet spaced above at least part of each floor zone, the air outlet being spaced further from the floor than the radiant heater and air inlet, the air outlet being arranged in use to extract a controllable quantity of air from inside of the enclosed area,
a computer control system, configured in use to independently control, for each floor zone, the quantity of air being drawn in and extracted from said floor zone based on the sensed temperature inside and outside the enclosed space.

The control method and computer control system may operate under computer control of software on non-transient computer memory. The control method and computer control system preferably operates automatically by sensing the difference in inside and outside temperature, and dependent on a required pressurisation, increases and decreases the throughput of the inlet(s) and outlet(s) accordingly.

In addition to basing the throughput of the inlet(s) and outlet(s) on sensed temperatures, pollution levels can also be used, e.g. using a sensor within the enclosed area.

The heater can also be controlled by the control system or method.

The positioning of the ventilation inlets and outlets, relative to the floor and the radiant heater, produces a thermal convection current within the zone, causing fresh air to descend to the warmer region, at or near the floor, and then moving sideways generally parallel to the floor in a convection current. Existing, warmer air ascends and is extracted by the ventilation outlet on the other side of the heater. This cycle continues with pollutants at or near ground level being raised above the working level at or near the ground and removed.

The radiant heater may be a tube radiant heater. In preferred embodiments, the tube radiant heater is a U-tube radiant heater, and preferably one having a diverting baffle located in the first tube adjacent the burner so as to divert, or scrub, the combusting flame from the top to the bottom and vice versa.

The floor zones need not be physically defined in the enclosed area, and can take any shape or form. Typically, square or rectangular zones are defined, each having a radiant heater substantially at, or close to, the geometrical centre or along one axis.

The control step or system may also control the level of heat delivered by the radiant heater using feedback from a temperature sensor.

BRIEF DESCRIPTION OF THE DRAWINGS

The invention will now be described, by way of non-limiting example, with reference to the accompanying drawings, in which.

DETAILED DESCRIPTION OF PREFERRED EMBODIMENTS

Embodiments described herein relate to apparatus and methods for controlling the temperature and/or ventilation within an enclosed area, particularly a High Volume Building (HVB) such as an industrial or commercial unit such as a factory, warehouse, hangar or workshop. In theory, the apparatus and methods can be employed in any enclosed area.

The term 'enclosed area' is intended to comprise any area bounded with walls, one or more of which can be openable, e.g. with partitioned walls or doors, and also a roof.

Figure 1:
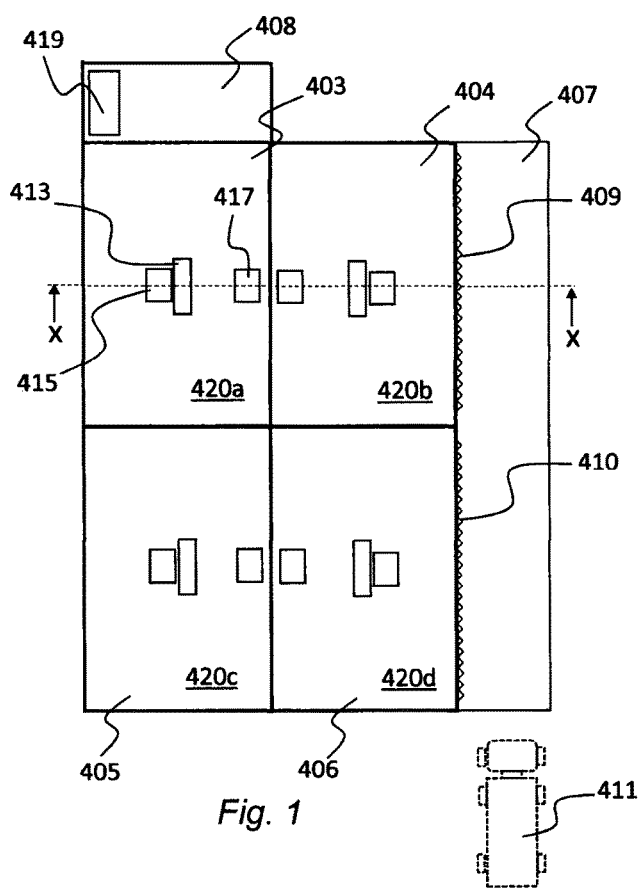
FIG. 1 is a top plan view of an enclosed workspace comprising a heating and ventilation system according to an embodiment of the invention.

Referring to FIG. 1, an example factory floorplan 401 is shown, in top plan view. It comprises four, orthogonally-arranged floor zones 420a, 420b, 420c, 420d which provide the main workspace in which, for example, machinery is located, or aircraft are maintained.

To the right-hand side of the second and fourth zones 420b, 420d is a service road 407 through which delivery vehicles 411 pass for picking up and/or delivering materials. Each said zone 420b, 420d is partitioned from the service road 407 by respective retractable doors 409, 410 which can be selectively opened and closed when required.

Each floor zone 420a-d has its own source of heat and ventilation, as will be explained below, with the aim of maintaining comfortable heat and air quality levels for workers. The heat and ventilation sources are controlled by a computer system 419 located within a control room, using a feedback control algorithm which takes as input signals from one or more sensors.

For ease of explanation, only those heating and ventilation components for a single floor zone, namely 420a, is shown and described. Other floor zones 420b-d may follow the same arrangement, or may have differently arranged numbers and spatial distributions of components.

Figure 2:
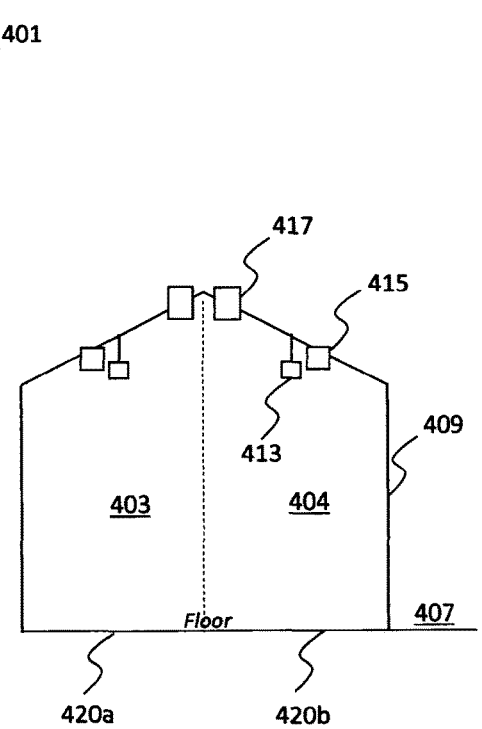
FIG. 2 is a top plan view of the FIG. 1 space, showing the layout of a further floor zone, which is useful for understanding the invention.

FIG. 2 shows how another zone 420d may use a different arrangement of components which may reflect different requirements, e.g. different machinery layout within that zone.

Each floor zone 420a-d has one or more associated radiant heaters 413 suspended beneath the roof, for radiating heat downwards in use. In this example, the first floor zone 420a comprises six radiant heaters 413 arranged in three pairs either side of the roof apex 440. Each radiant heater 413 is arranged in use to raise the temperature of part of the underlying floor 420a based on control signals from the computer 419, which controls the on/off and on-level temperature.

A suitable form of radiant heater 13 is disclosed in EP2988086 the contents of which are incorporated herein by reference and which will be described below.

Each radiant heater 413 comprises a gas burner which operates under computer control, i.e. in response to control signals received from the computer system 419 in the control room. Heat radiated by each radiant heater 413 is delivered primarily to the floor of its respective floor zone.

Adjacent, but spaced apart from, the radiant heaters 413 are one or more air intakes 415 arranged to draw air inside the enclosed area from the outside. Each air intake comprises at least one electrically-operated fan, the on/off state and speed of which is computer controlled by the computer system 419. The actual outlet aperture or duct of the intake 415, i.e. that part which disperses the air to within the building, is directed sideways, i.e. generally parallel with the floor, but usually not in the direction of the radiant heater(s) 413. The height of the outlet aperture or duct is either level with, or preferably below, the radiant heater 413.

Each floor zone 420a-d also has one or more air outlets 417 which, like the inlets 415, can be distributed in any pattern over the floor zone 420a; in this case, the outlets 417 are adjacent the central apex of the zone, although other arrangements can be envisaged. Each air outlet 417 has a channel penetrating the roof to extract air from the inside of the enclosed area 420a to the outside environment. Each air outlet 417 comprises at least one electrically-operated fan, the on/off state and speed of which is computer controlled by the computer system 419. The intake duct of the air outlet 417 needs to be raised higher above the floor than the heaters 413 and air inlets 415.

Figure 3:
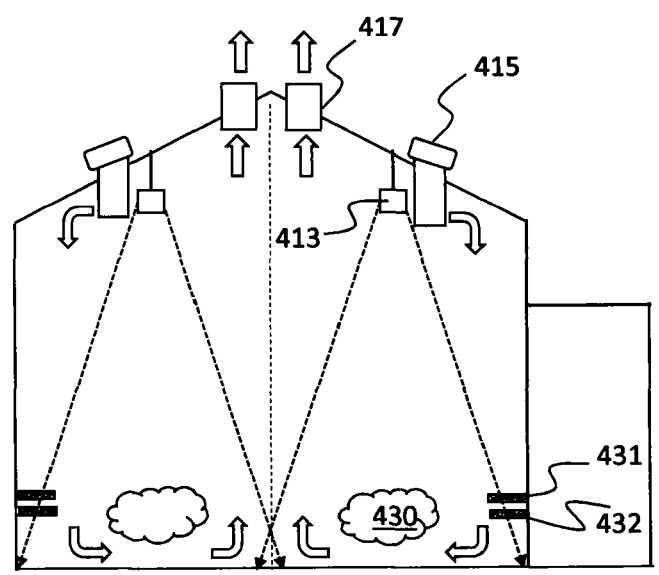
FIG. 3 is a side view of one floor zone shown in FIG. 1.

FIG. 3 shows a side view of the above-mentioned floor zone 420a which indicates the relative positions and heights of the radiant heaters 413, air intakes 415 and air outlets 417.

The computer system 419 is arranged to operate under computer program control to control each of the heaters 413, air intakes 415 and air outlets 417 on a zone-by-zone basis to regulate the temperature and air quality of each zone using feedback from sensors. As shown in FIG. 3, the sensors are temperature sensors 431a and 431b, respectively measuring the temperature outside and inside of the enclosed area. The external sensor 431a is provided on the outer roof of the building, whereas the internal sensor 431b is provided close to the roof interior.

A pollution sensor 432 may also be provided for each floor zone.

For example, the temperature sensors 431a and 431b will indicate the difference in temperature between the outside and inside. This difference can be used by the computer system 419 to calculate the thermal expansion of the air as it moves from outside to inside (or vice versa) and therefore what speed the fans of the air intakes 415 and/or air outlets 417 have to operate at in order to maintain a required condition within the zone, e.g. a positive pressure condition or negative pressure condition.

As another example, when one or both doors 409, 410 are opened for a delivery vehicle 411, heat will be lost. Initially the second and fourth zones 404, 406 will lose some heat, detected by the internal temperature sensors 431b within those zones, and hence the computer system 419 can increase the radiant output from the associated heaters until such time as the doors 409, 410 are closed and/or the required temperature is achieved.

As another example, as air quality levels decrease (i.e. pollution levels increase) which may be due to the vehicle emissions in the lane 407 or due to machinery operating within the workspace, this will be detected by pollution sensors 432 connected to the computer system 419 and fresh air drawn into the appropriate zone(s). Air is drawn in by fans operating at a speed which is appropriate/proportional to the level of pollutants detected by the respective zonal sensor or sensors; the greater the level of pollution, the greater the volume of fresh air that is introduced within the enclosed area.

Referring to FIG. 3, it is a particular feature of the radiant heaters 13 employed in the embodiments, namely those shown and described in EP2988086, that a large proportion of primary energy used by the heater is converted into useful heat at, or a few meters above, the floor level where the workforce is located. This means that as the fresh air is drawn into the enclosed area by a zonal air intake 415, the cooler air descents generally downwards towards the warmer floor area of said zone where it begins to warm up. At the same time, the air outlet 417 within the same zone is operating, with the result that the air at the ground level moves substantially sideways in a convection current, parallel with the floor, and towards the edge of the zone below the air outlet before rising again due to it being warmed by the heater 413. The net effect is a cyclic convection current of air (downwards from the inlet, sideways near the floor and upwards to the outlet). This cycle usefully takes airborne pollutant material from the floor level to the outlet 417 where it is exhausted to the outside. At the floor level, fresh, clean air replaces the polluted air.

As will be appreciated, the higher the levels of pollutant detected at, or just above the floor level, the fan speed of the air inlet and outlets 415, 417 is increased accordingly. When the sensed levels of airborne pollutants decrease, the fan speeds likewise decrease.

Airborne pollutants may comprise smoke, carbon monoxide, carbon dioxide, sulphur dioxide, methane, particulates, dust etc.

Figure 4:
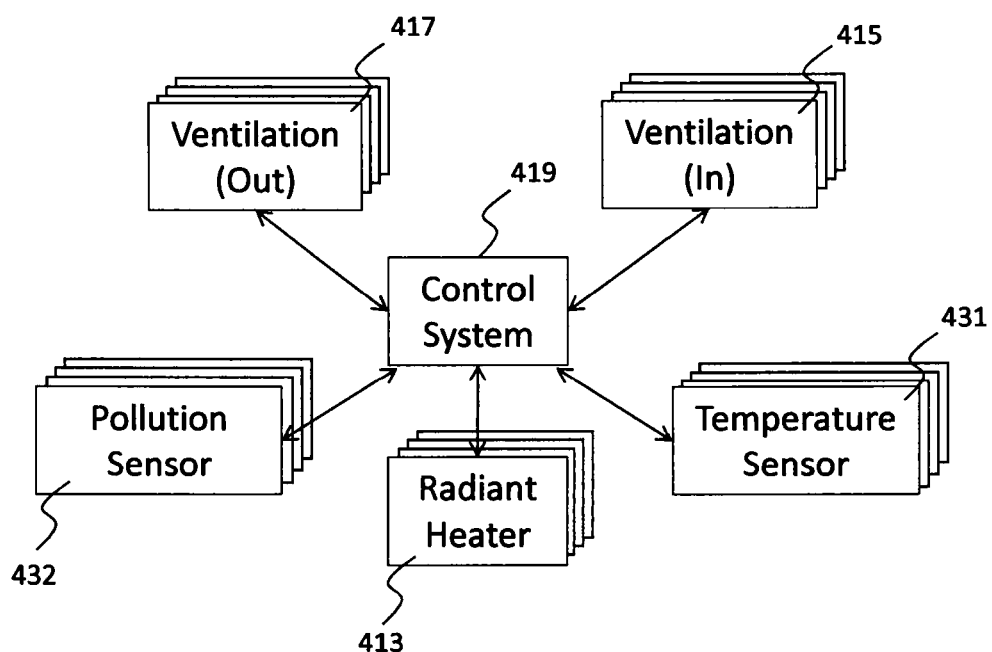
FIG. 4 is a block diagram showing functional modules of the heating and ventilation system used in the FIG. 1 embodiment.

FIG. 4 is a block diagram of functional components within the computer system 419, comprising a centralised control system 419 which is typically a computer having a processor or microcontroller, RAM for the temporary storage of data in program control and execution, memory storing an operating system and a dedicated control program for the present embodiment, and one or more interfaces, which can be wired or wireless, e.g. using WiFi. The control system 419 is connected to each of the elements in each of the four floor zones. These are the radiant heater 413, air inlet 415, air outlet 417, as well as the temperature sensor 431 and pollution sensor 432. The control system 419 is therefore configured to independently control each set of zonal components.

By performing the above process using feedback from the temperature and pollutant sensors 431, 432 to control ventilation in a zonal manner, energy is used highly efficiently whilst maintaining heat and environmental levels within required levels. In particularly large workspaces, for example aircraft hangars, the zonal nature of the radiant heaters 413 and positioning of the ventilation systems 415, 417 means that unused zones need not be operated or ventilated at a given time, saving energy. Further, it has been found that there are no hot or cold spots, no cold air draughts, as well as significant energy savings.

Figure 5A:
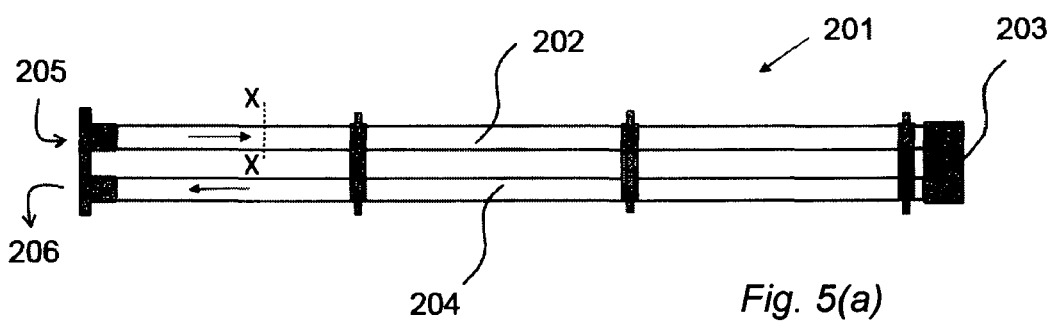
FIGS. 5a-c show different schematic views of a conventional radiant burner tube, which is useful for understanding the invention.
Figure 5C:
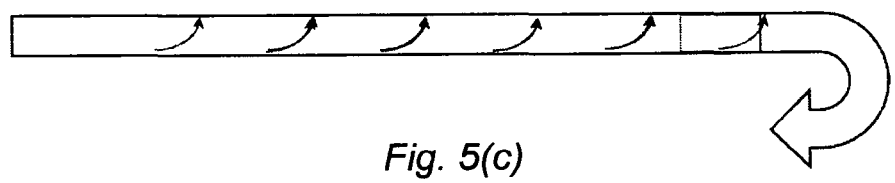
Figure 5B:
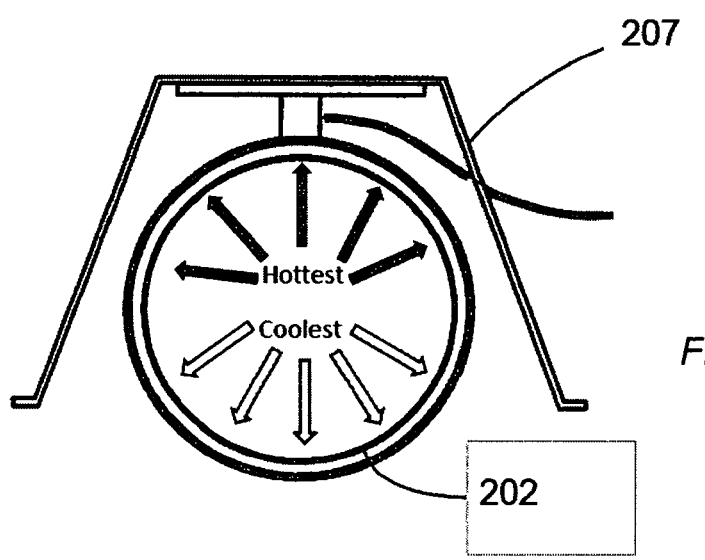

A preferred type of radiant heater 413 will now be described with reference to the subsequent figures, particularly radiant heaters of the type shown in FIG. 5a, namely radiant heaters formed with a generally U-shaped heating element which is a mild-steel tube formed of first and second straight sections with an interconnecting U-bend. A gas burner and an extractor fan are provided so that, in use, combustion gases are drawn along the tube in the direction indicated.

Applicant has determined that a the highest efficiency radiant output and transfer to below surfaces is in the low radiant temperature band, at or near 450° C., which delivers a figure approaching 100% radiant output. Measurement of this temperature is usually made at or near the U-bend part of the heating element, which represents the location of average tube temperature.

In a conventional radiant heater, due to the previously-mentioned tendency for hot gases to travel along the upper level of the tube (due to the convective behaviour of the flame, typically operating at 1100° C.) temperatures are typically well-above 450° C. in the upper half of the tube and well below this temperature in the lower half, when measured at the U bend. As a consequence, radiant output relies heavily on the use of a reflector positioned above the heating element. This requires more fuel to achieve the required heating to surfaces below.

In the present embodiments described herein, however, a baffle is provided, either fixed or removable within at least the first straight section, i.e. that which communicates with the gas burner. The baffle is arranged in use to redirect the travel of combusting gas, i.e. the flame, from the upper half of the tube to the lower half, and preferably still, to create a swirling effect, effectively replicating a turbine engine effect (in reverse) so that the hotter gases which naturally tend towards the upper half of the tube are redirected downwards, and the cooler gases upwards.

To achieve this, a first embodiment provides a baffle assembly 220 to be described below.

Figure 6:
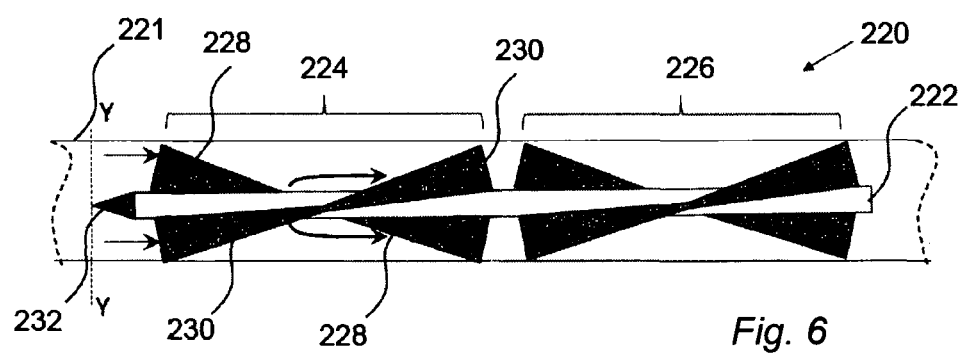
FIG. 6 is a partial cross-sectional view of a first tube portion incorporating a re-directing baffle according to the invention.
Figure 7:
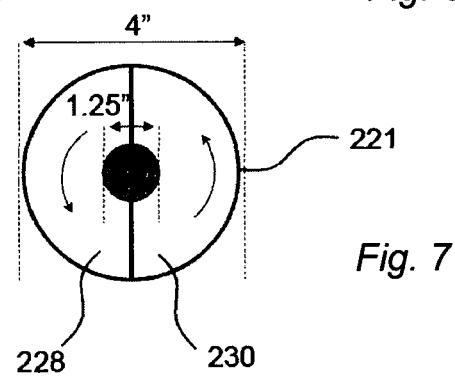
FIG. 7 is a cross-sectional view of the FIG. 6 tube portion along axis Y-Y.

A first embodiment baffle assembly 220 is shown in FIG. 6, and comprises a longitudinal post 222, which can be hollow in order to be lightweight and cost-effective to manufacture, supporting a pair of identical baffles 224, 226. The baffle assembly 220 is shown located in fixed relation inside a first straight section 221 of a U-shaped heating element. Each baffle 224, 226 comprises a pair of opposed vanes 228, 230 each providing a curved surface extending helically around the post 222 as shown. The fore end of the post 222 has a cone 232 arranged in use to urge gases being drawn towards the first baffle 224 outwards to the vanes 228, 230. As shown in FIG. 7, which is the end view of the first baffle 224, the terminating edges of the vanes 228, 230 are vertically oriented within the first straight section 221, with the first vane being arranged in use to redirect the hotter gases from the upper region of the tube downwards and the second vane arranged in use to redirect the cooler gases upwards. The longitudinal extent of each of the vanes 228, 230 is a half-pitch helix, providing a turn angle of 180°, or thereabouts, to generate a vortex or swirling effect within the tubular section 202. This swirling travel of the combusted gases is continued by the adjacent baffle 226, arranged downwards of the first baffle 224 on the post 222.

In the example shown in FIGS. 6 and 7, the diameter of the post 222 is substantially 31.75 mm (1.25 inches) and the outer diameter is 101.6 mm (4 inches.)

In some embodiments, the baffle assembly 220 may support just one baffle, or more than two baffles. The baffle assembly 220 may comprise alternative vane configurations in terms of sloping or curved surfaces in order to cause the swirling effect.

Figure 8:
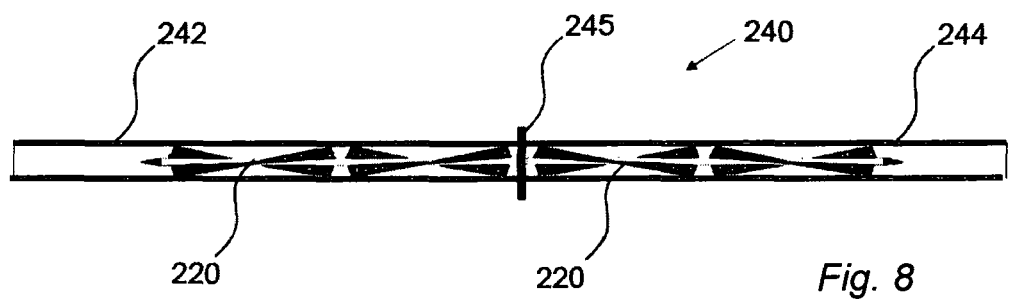
FIG. 8 is a longitudinal cross-sectional view of the FIG. 6 tube portion.

FIG. 8 shows two such baffle assemblies 220 within the first straight section 221 of a radiant heater heating element. It will be appreciated that the heating element will also comprise a U-bend and a second (return) straight section which communicates with an extractor fan in the manner indicated previously with reference to FIG. 1a.

In this embodiment, the tubular section 221 is divided into two parts 242, 244 which are connect using a connector 245. Each baffle assembly 220 is mounted within the parts 242, 244 first by disconnecting the parts, inserting each assembly within the disconnected tubular ends, and then re-connecting the parts 242, 244. The dimensions of each baffle assembly are such that they are fixedly mounted 635 mm (25 inches) from the external ends of the tubular section 221. Each baffle assembly 220 is 245.1 mm (96.5 inches) in length, meaning the combined length within the tubular section 240 when joined is 4902.20 mm (193 inches). The overall length of the tubular section 240 is therefore 6172.20 mm (243 inches.) These figures are approximate and it will be appreciated that some deviation either side is possible. Nevertheless, the stated dimensions, and particularly the spacing from the ends to the baffle assemblies 220, appear in testing to produce excellent results in terms of heat distribution and therefore efficiency.

Figure 9:
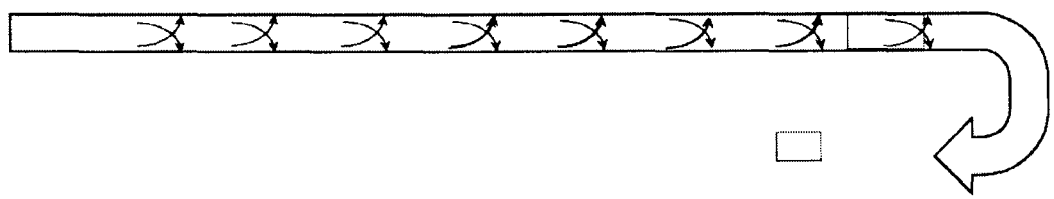
FIG. 9 is a detailed view of a connector portion shown in FIG. 8.

Referring to FIG. 9, which is a close-up view of the connected region, it will be seen that the far-end of each post 222 (the end opposite the cone end 232) is mounted within the connector 245. For the avoidance of doubt, the baffle assemblies 220 are fixed and do not rotate relative to the tubular section 221. All fittings are stainless steel.

Figure 10:
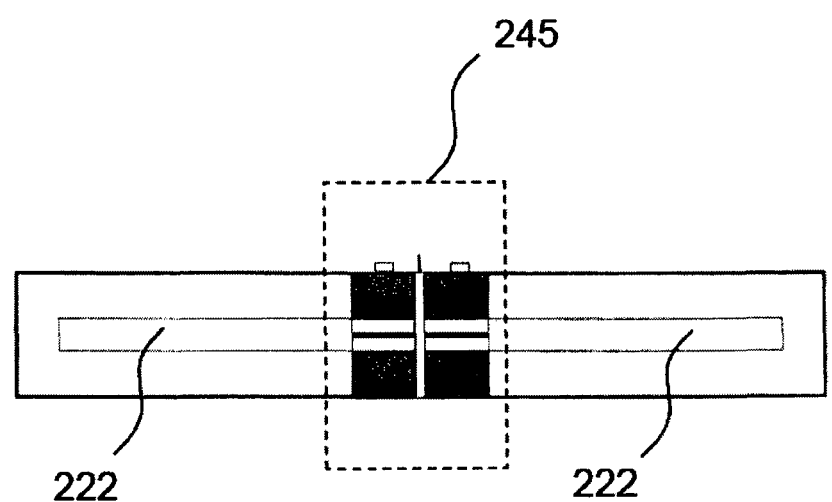
FIG. 10 is a schematic longitudinal view of gas travel in the FIG. 8 tube portion.
Figure 11:
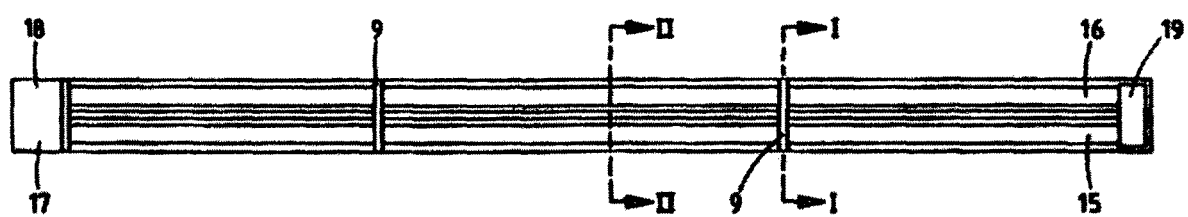
FIG. 11 is a plan view from above of a radiant heater according to a further embodiment of a known heater which can incorporate a re-directing baffle according to the invention.
Figure 12:
FIG. 12 is a plan view from below of the embodiment of FIG. 11.
Figure 13:
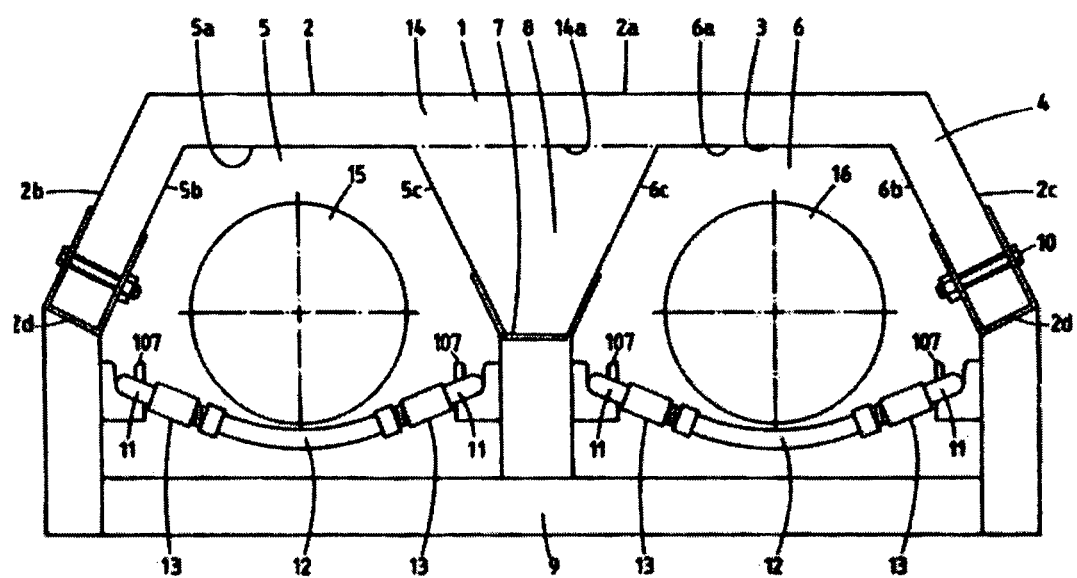
FIG. 13 is a sectional elevation along line I-I in FIG. 12.

FIG. 10 indicates schematically the effect of redirecting the combusted gas around the tubular section 240 by means of the baffle assemblies 220. The hotter gases no longer run along the top of the tubular section 240 due to the spoiling effect of the baffle assembly 220. This replicates a reverse turbine engine effect, whereby pressure is created by the hot combusted gases expanding, which is then used to increase power. The baffles 224, 226 (which are fixed, in series) create pressure and efficiently exploit the travel of combusted gas by disrupting the natural flow of the highest temperature gas to scrub the optimum output area of the tube, which is on the lower half (effectively between the 4 and 8 o'clock positions if referenced to a clock face on the cross-section). The effect of this is to raise the average temperature at this lower half to (or towards) the optimal 450° C. at the U-bend, delivering direct radiant heat to surfaces below, and also requiring less gas than the conventional radiant heater system to achieve this.

Furthermore, a radiant heater using such baffle assemblies 220 offers a cleaner combustion process, with little or no carbon monoxide or sulphur dioxide being produced, removing or reducing the need to provide an extracting flue to discharge these gases to the atmosphere.

For completeness, we now describe further embodiments which relate to radiant heater technologies provided by the Applicant, as disclosed in published patent application numbers WO96/10720 and WO6/106345, the disclosures of both of which are incorporated herein by reference. Whilst the drawings and related descriptions do not explicitly show or describe the use of such baffles or baffle assemblies 220, it will be appreciated that it is straightforward to apply such baffle or baffle assemblies into the existing heaters, e.g. at manufacture or by retro-fitting, and so these are described to indicate forms of radiant heater assembly within which such baffles and baffle assemblies 220 can be added in order to provide the benefits in terms of efficiency. Certain features shown in relation to these additional embodiments may or may not be required as a result of the improved radiant efficiency obtained.

The disclosure of WO96/10720 will first be introduced. Referring to FIGS. 11 to 14, it can be seen that in one such embodiment, the radiant heater comprises a housing generally designated 1 having an outer wall 2 formed of mild steel and formed so as to have a generally horizontal region 2a and downwardly divergent portions 2b and 2c.

Secured to the outer wall 2 by means of riveted joints at location 2d is an inner wall 3, formed of bent aluminium sheet, the downwardly facing surface of which has been anodised, and preferably provided with gold colour. Inner wall 3 is shaped so as to define two downwardly open sub channels 5 and 6, each of the sub-channels having an upper reflective surface 5a, 6a, and downwardly divergent lateral reflective surfaces 5b, 5c, 6b, 6c. Surfaces 6c and 6c, together with a linking lower wall 7 form a central barrier portion 8, the function of which will become apparent from the following description. At spaced (e.g. one metre) intervals along the housing, brackets 9 are secured to the housing. Bracket 9 is illustrated in FIG. 9, where it can be seen that the bracket has a generally horizontal cross-bar portion 101 formed of box section steel and, secured thereto, by means of bolts 102, a generally upright member 103 at the upper ends of which are secured attachment brackets 104 of channel section. At the mid-point of the cross-bar portion 101, is secured, by welding, a short transversally mounted piece of steel box section 105 from the upper corners of which extend divergent arms 106, which in use are arranged to embrace, but are not fixedly attached to, the central barrier portion 8 of the housing. The bracket is secured to the housing by means of mounting fixtures 104 which fit over the lower edges of the housing and are secured in place thereon by means of bolts 10.

The brackets 9 are provided with inwardly facing pairs of hook elements 107 which engage the retaining rings 11 on the respective ends of tube-supporting cables 12.

Tube-supporting cables 12 are typically formed from a flexible high temperature resistant metallic material such as steel, and are provided with screw adjusters 13 formed from a non-ferrous metal such as brass which allow the cables 12 to be shortened or lengthened. Burner tubes 15 and 16 rest loosely on the cables 12 and, as will be appreciated, the height of the tube within the housing may be varied by shortening or lengthening the supporting cables 12.

The burner tubes 15 and 16 extend along the channel from one end of the housing to the other, tube 15 being connected at one end 17 with a gas burner (not shown) which heats the interior of the tube. Combustion gases are drawn along the tube from the burner 17 via a U-bend (not shown) at location 19 and into the return tube 16 by means of an extraction fan (not shown) mounted at end 18.

The tubes 15 and 16 are formed from steel, and may be surface treated to maximise their radiative efficiency. In use, the tube 15 is heated by means of the gas burner and then functions as a radiator heating element, with radiation from the surface of the tube being reflected by reflective surfaces 5a, 5b and 5c in a downwards direction.

Tube 16 also gives out radiation, but to a lesser extent since the tube is somewhat cooler than tube 15.

In order to prevent conductive and convective losses through the upper surface of the housing, a layer of insulation 14 is disposed between the inner and outer walls. The layer of insulation 14 fills the space between the inner 3 and outer 2 walls except at location 14a, where the surface 14a of the insulating material, together with walls 5c and 6c of the central barrier portion 7 define a hollow channel running along the length of the housing.

The thermal insulating material is selected so as to be resistant to the operating temperatures of the heater, and for example may be selected so as to resist temperatures of 600° C. and above.

Figure 14:
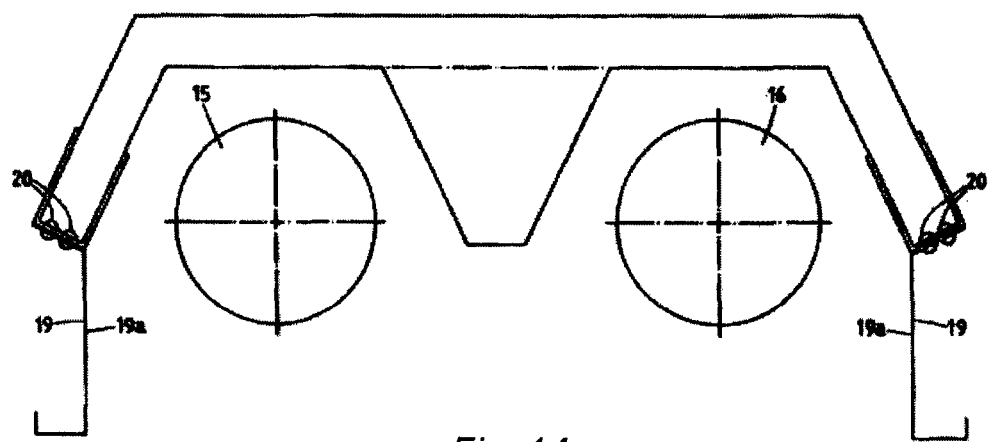
FIG. 14 is a sectional elevation along line II-II in FIG. 12.

As illustrated in FIG. 14, the housing has secured to the lower edges thereof a reflective skirt comprising side panels having inwardly facing anodised aluminium reflective surfaces 19a. Panels 19 are secured to the housing by means of rivets 20 and are also mounted on, and held rigidly in place by, brackets 9. The reflector skirt 19 serves to focus and reduce the angle of spread of radiation from tubes 15 and 16.

The reflective skirt 19 may be replaced by reflector skirt 21, 22, 23 or 26 as illustrated in any one of FIGS. 15 to 18 in order to vary the angle of spread of the radiation from the heater tubes. For example, when it is necessary to mount the heaters at a higher point within a building, e.g. as a result of the roof or ceiling support structure or other available supporting structures being much higher above the ground, a longer reflective skirt as illustrated in FIG. 14 may be employed to reduce the spreading of the radiation thereby to provide the desired radiative flux density at ground level. Conversely, where it is necessary to mount the heaters at a lower point in a building, the reflective skirt shown in FIG. 14 may be replaced by the shorter reflective skirt shown in FIG. 15.

Figure 15:
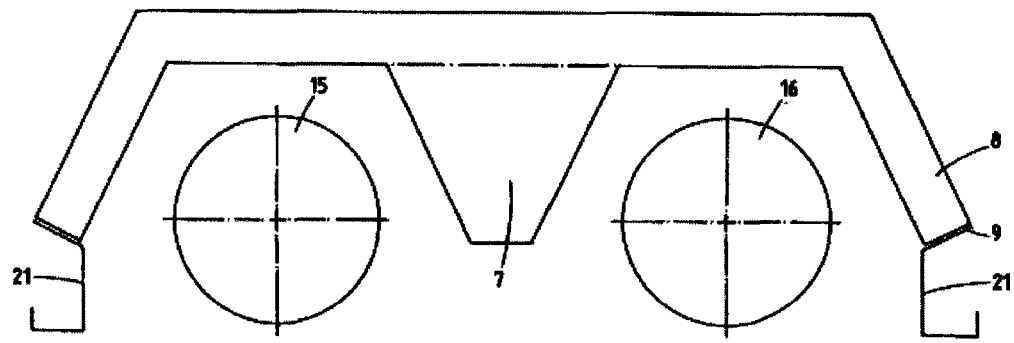
FIGS. 15 to 18 illustrate the embodiment of FIGS. 11 to 14, but with varying reflective skirt configurations.
Figure 16:
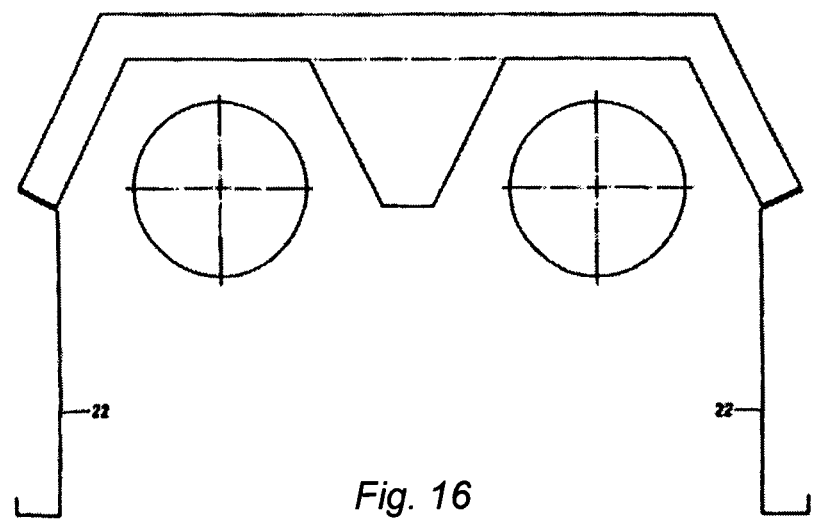
Figure 17:
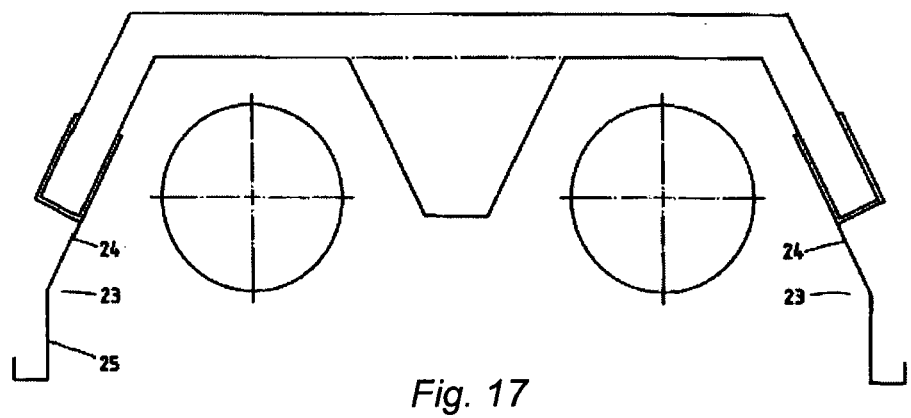
Figure 18:
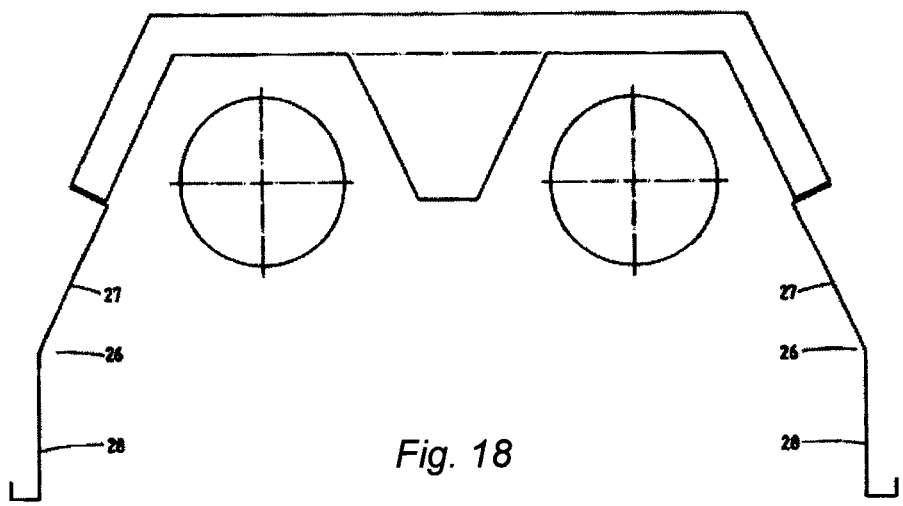
Figure 19:
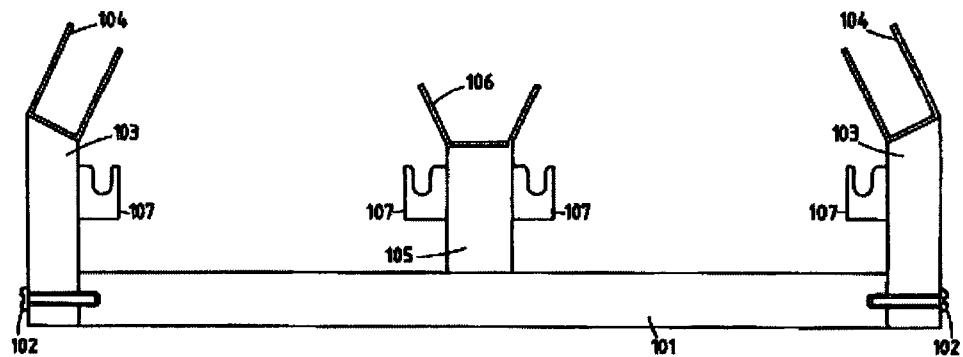
FIG. 19 is a sectional elevation of the bracket shown in FIG. 13.
Figure 21:
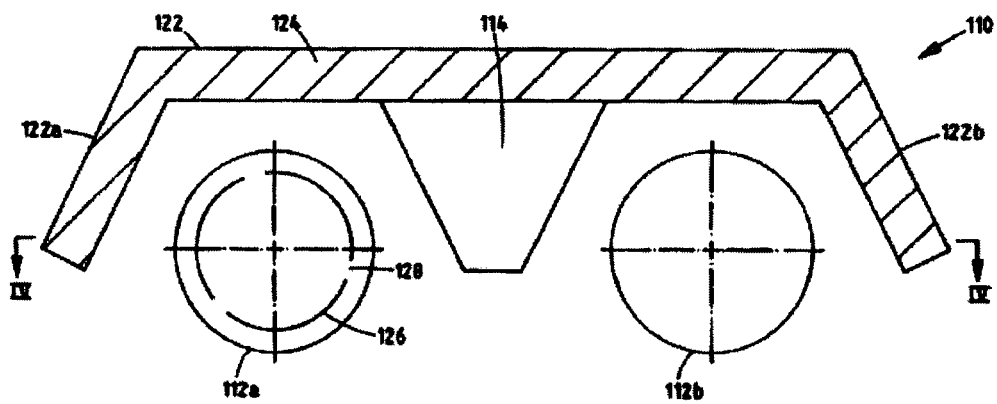
FIG. 21 is a section on III-III of FIG. 20.
Figures 22, 23:
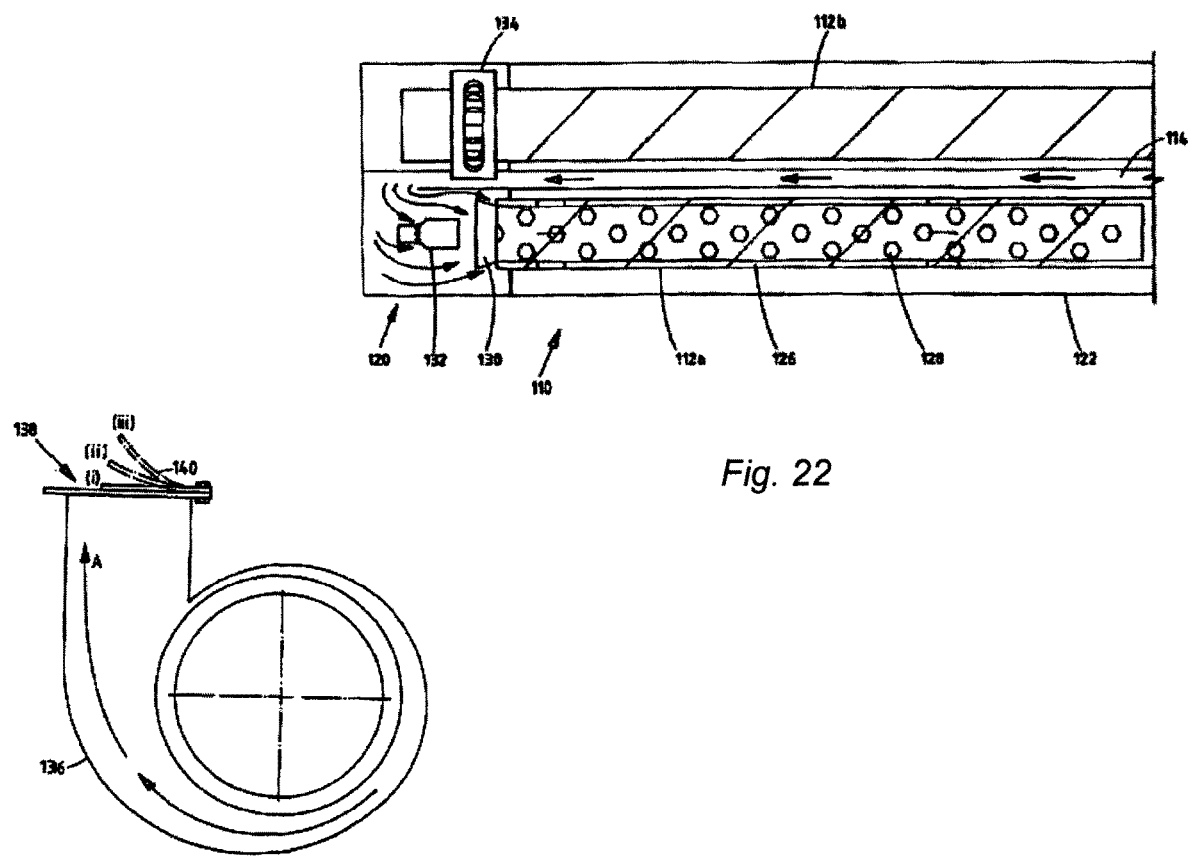
FIG. 22 is a partial cross-section on IV-IV of FIG. 21, and as such is an enlarged, partially sectional view of the inlet portion of FIG. 20.
FIG. 23 is a diagrammatic illustration of the air vent of FIG. 22.

In FIGS. 15 and 16, the reflective skirts are shown as having generally parallel downwardly extending walls, but they may also, for example, be inclined, as illustrated in FIGS. 21 and 22, where the upper parts 24 and 27 respectively of the reflective skirts are divergent and follow the lines of the housing, and the lower parts 25, 28 of the reflective skirts 23, 26 respectively are substantially parallel.

When designing a heating system for a building incorporating the radiant heaters of the invention the building floor area A is first measured and the desired temperature rise AT above ambient is selected. From the floor area A and AT, the required radiant flux density 9 at floor level is then determined. Taking into account the height at which the heaters are to be suspended within the building, and taking into account also the shape of the floor area, an array of heaters is then chosen, each heater having a reflective skirt of the appropriate configuration to provide the desired radiant flux density at its given location in the building. As will be appreciated, the configuration of a reflective skirt for a heater in a corridor, alcove or bay would be different from the configuration of the reflective skirts on heaters in the main hall of a building.

An advantage of the embodiments shown in FIGS. 11 to 16 specifically set forth above is that they provide a basic radiant heater which can readily be adapted to provide the desired radiant flux density at a given location in a building by selecting an appropriately shaped reflector skirt. The radiant heaters according to this embodiment thus offer significant advantages over presently available radiant heaters which tend to be of fixed configuration and do not have the facility for modification in the manner illustrated above.

Figure 20:
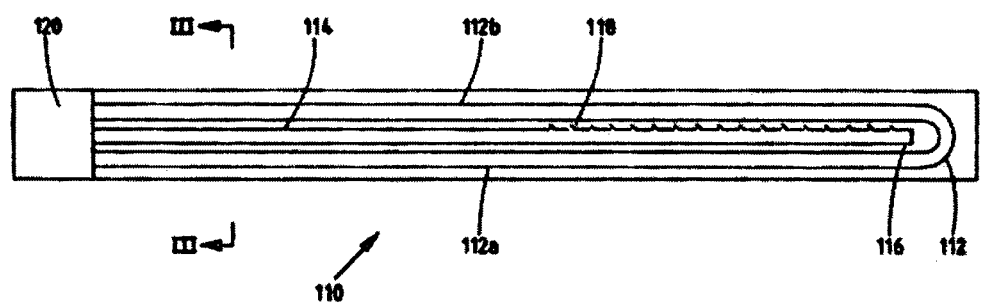
FIG. 20 is a view of a heater according to a further embodiment of a known heater from the underside.

A further aspect is exemplified by the heater illustrated in FIG. 20. The heater 110 comprises a substantially U-shaped heater element 112 comprising a pair of linked generally parallel heater tubes 112a and 112b. Between the tubes 112a and 112b is a flow passage 114 having a closed distant end 116 lying in the base of the U defined by the heater tube 112.

Louvres 118 are provided on the side of the flow passage 114 facing tube 112b, along roughly one-third of the length of the flow passage 114 nearest its distant end 116. The ends of the tubes 112a, 112b and flow passage 114 are enclosed in a compartment 120. The interior of the compartment 120 is shown in more detail in FIG. 22, described later.

FIG. 21 shows the heater in cross-section. It can be seen that the outer casing 122 comprises a generally hollow section filled with an insulating material 124. The casing 122 has side walls 122a, 122b. Suspended from the casing 122 is a hollow truncated V-section, which forms the flow passage 114 and which runs along the length of the casing 122. Thus, the casing 122, side walls 122a and 122b, and flow passage 114 between them define two elongate regions. Within these elongate regions are suspended the heater tubes 112a and 112b respectively. The suspension is achieved by a suspension means, not shown in FIG. 21.

This can be as shown in the embodiments of FIGS. 11 to 19.

FIG. 21 also shows that tube 112a has an inner liner tube 126 which lies generally concentrically within tube 112a and is perforated by perforations 128.

Referring to FIG. 22, this shows the region about the enclosure 120 into which project the heater tubes 112a and 112b. Heater tube 112a can be seen to contain the inner liner tube 126 along part of its length, although both the inner liner tube 126 and heater tube 112a are coterminous at an open end within the enclosure 120. Inner liner tube 126 is, as previously mentioned, perforated by perforations 128. At the open end, the inner liner 126 is provided with a flared inlet 130. Facing the inlet 130 is a burner 132 supplied with fuel. Burner 132 is a standard item.

The heater tube 112b has an open end extending into the enclosure 120, where it is connected to a suction fan 134 which is arranged to extract gas from the heater tube 112b and vent it to atmosphere through a vent not shown in FIG. 22.

The interior of the enclosure 120 is partitioned to prevent gas flow between the free ends of the heater tubes 112a and 112b. The flow passage 114 communicates with the region into which tube 112a projects.

FIG. 23 shows the vent 136 of the suction fan 134.

The vent 136 has an opening 138 which is partially covered by a bimetallic element 140. When air being expelled from the vent 136 through the opening 138 is cool, the bimetallic strip 140 is flat and is in position (i), almost completely covering the opening 138. Thus, the flow out of the vent 136 is restricted. As the temperature of gas flowing out of the opening 138 increases, the bimetallic element 140 bends away from the opening 138 through position (ii) and progressively into position (iii), thus reducing the restriction on flow and allowing more gas to pass.

It can be seen that in general, only part of the opening 138 is uncovered at any one time, but in the generally spiral outlet employed in this embodiment, this does not matter because escaping gas generally follows the route shown by arrow A. Thus, a greater proportion of escaping gas passes through the outer third of the outlet 138 and hence in its fully withdrawn position (iii) the bimetallic element 140 allows a sufficient volume of gas to pass.

The operation of the heater 110 of the present invention is generally as follows. The suction fan 134 draws air along the tube 112b, around the U-bend in the heater tube 112, and hence along the tube 112a. Thus, there is a negative pressure in the region of the burner 132. For this reason, air is drawn along the flow passage 114, being supplied to the passage via louvres 118. Since the louvres face the heater tube 112b, air will be drawn from the vicinity of that tube. Once the heater is running, air will remain in the elongate space surrounding the tube 112b through convection, and therefore can be expected to flow into the louvres 118 from along the entire length of the tube 112b.

Once it reaches the burner 132, air mixes with fuel and is ignited when it passes into inlet 130. Inlet 130 ensures that all flames pass into the inner liner 126, where they are fed with secondary air flowing from the space between the inner liner 126 and the burner tube 112a via perforations 128. Hence, inner liner 126 protects the burner tube 112a from the extreme temperature of the flames in the vicinity of the burner 132. However, since the temperature of the flame will decline along the length of the burner tube 112, the inner liner 126 is not required along the entire length and hence is shorter than the burner tube 112.

Inevitably, the tube 112a will be hotter than the tube 112b, and these two tubes will themselves have a graduated temperature there along. However, the provision of the tubes in a U-formation means that, along the length of the heater, the average temperature of the two tubes remains substantially constant. Thus, the total radiative output of the heater is substantially constant along its length.

In addition, the end of the tube 112b nearest the suction fan 134 will be at such a low temperature that its radiative efficiency will be very low compared to the equivalent portion of the burner tube 112a. However, this is not a problem in the present invention since the air around tube 112b, which would normally escape through convection without contributing to the radiative power of the heater, is instead drawn alongside tube 112b, through louvres 118, and used as pre-heated combustion air.

The heater 110 is able to reach its operating temperature more quickly, due to the temperature-dependent restriction on the outlet 136, described above. Thus, when fully cold, the heater operates in a fuel-rich state in which there is little air (by volume) flowing along heater tubes 112. Thus, the working temperature is reached more swiftly. However, once that working temperature is reached, the flow restriction on the outlet 136 is substantially removed. This effect can be enhanced, if desired, by providing flow restrictions such as baffles within the tube 112b.

Figure 24:
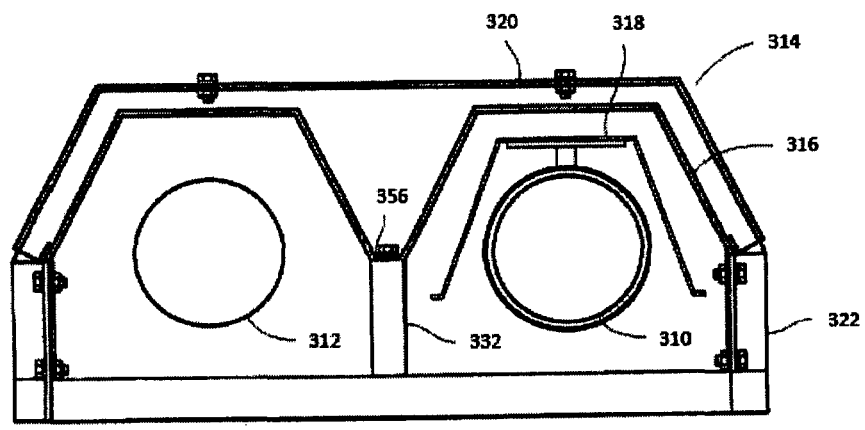
FIG. 24 is an sectional view of a known heater unit to which the baffle according to the invention can be applied.

Turning now to another known system, namely that disclosed in WO06/106345, referring first to FIG. 24, the radiant heater comprises two burner tubes 310, 312 located within a housing, generally designated 314. The housing 314 includes a reflector assembly 316, a deflector assembly 318 and a top cover assembly 320.

Figure 25:
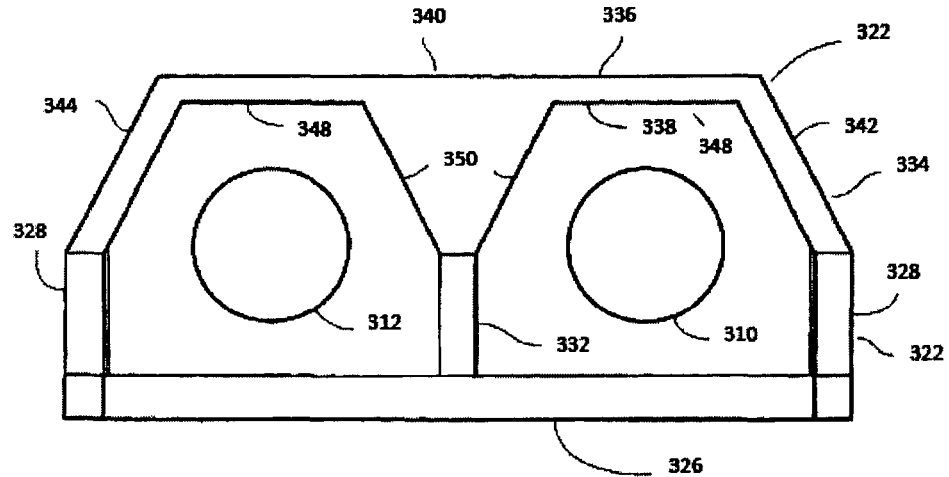
FIG. 25 is the view of FIG. 24 showing the bracket assembly.

A bracket assembly 322 is provided at spaced (e.g. one meter) intervals along the housing 314. Such a bracket assembly 322 is shown in FIG. 25.

The bracket assembly 322 comprises a lower bracket 324 which has a generally horizontal cross-bar portion 326 formed of box section steel and, secured thereto, by means of bolts (not shown), a generally upright member 328. At the midpoint of the cross-bar portion 330, is secured, by welding, a short transversally mounted piece of steel box section 332.

An upper bracket 334 has an outer wall 336 and an inner wall 338. The outer wall 336 is formed so as to have a generally horizontal region 340 and downwardly divergent portions 342 and 344. The ends of the divergent portions 342, 344 of the upper bracket 334 are secured to the upright members 328 of the lower bracket 324.

The inner wall 338 of the upper bracket 334 is shaped so as to have first and second horizontal regions 346, 348 divided by downwardly convergent members 350, the distal ends of which are secured to the steel box section 332 of the lower bracket 324.

Figure 26:
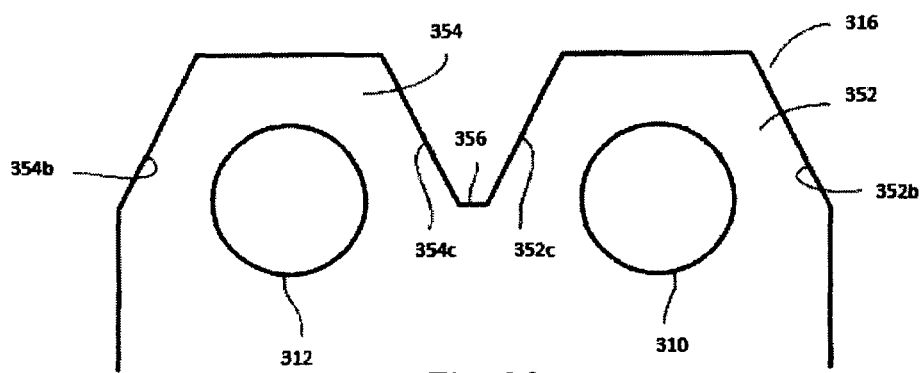
FIG. 26 is the view of FIG. 24 showing the reflector assembly.

The reflector assembly 316 is shown in FIG. 26. The reflector assembly 316 comprises a sheet of aluminium, the profile of which follows that of the inner wall 338 of the upper bracket 334. The reflector 316 is attached to the inner wall of the upright members 322 of the lower bracket and the top surface of the box section 332 via a nut and bolt, or similar, mechanism.

The reflector 316, once installed as part of the housing 310 therefore defines two downwardly open-sub channels 352, 354, each having an upper reflective surface 352a, 354a and downwardly divergent lateral reflective surfaces 352b, 352c, 354b, 354c. Surfaces 352c and 354c are linked together via a linking wall 356 which is bolted to the top surface of the box section 332.

Figure 27:
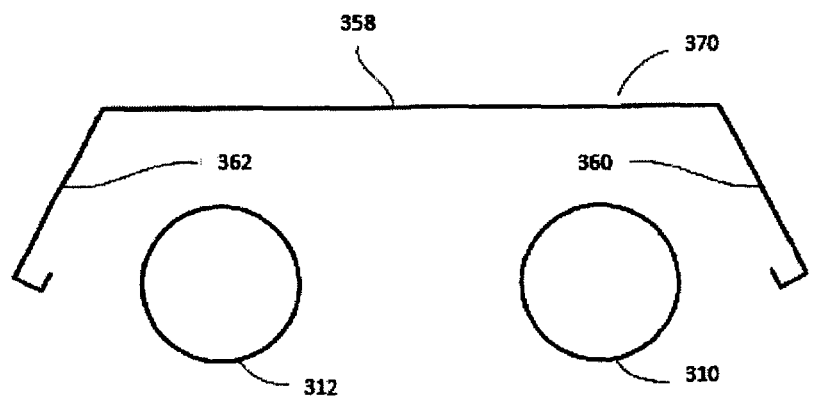
FIG. 27 is the view of FIG. 24 showing the top cover.

The top cover assembly 320 is shown in FIG. 27. The cover 320 comprises a sheet of mild steel which has a generally horizontal region 358 extending to downwardly divergent portions 360, 362. The cover 320 is bolted to the outer wall 336 of the upper bracket 334 so as to suspend approximately 1.5 to 2.5 cm above the reflector 316. No insulation is provided between the cover 320 and the reflector 316. As a result, the temperature of combustion air entering the burner is increased by absorbing additional heat from the entire top surface of the reflector 16 which, in turn substantially increases the flame temperature. This has the effect of markedly improving the output of the heater (by some 10 to 15%) and thus the efficiency and overall performance of the system as the total radiant heat output of a heater is proportionate to the overall temperature of the tubes 310, 312 within the system.

Figure 28:
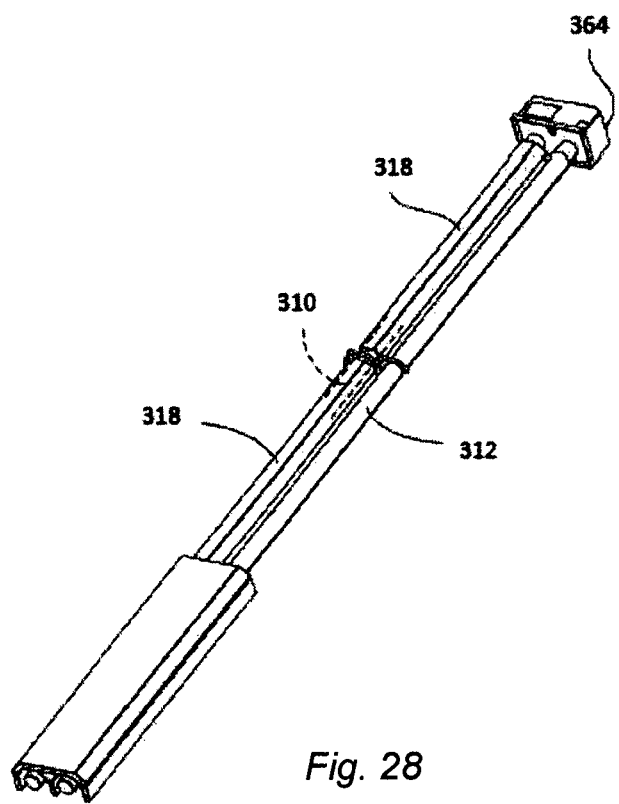
FIG. 28 is perspective view from above of the burner tubes of FIG. 24.

Referring now to FIG. 28, the burner tubes 310, 312 extend along the channels 352, 354 from one end of the housing 314 to the other. Tube 310 is connected at one end to a gas burner 364 which heats the interior of the tube 310. Combustion gases are drawn along the tube 310 from the burner 364 via a U-bend (not shown) and into the return tube 312 by means of an extraction fan (not shown) mounted at one end.

The tubes 310, 312 are formed from steel or the like, and may be surface treated to maximise their radiative efficiency. In use, the tube 310 is heated by means of the gas burner 364 and then functions as a radiator heating element. Tube 312 also gives out radiation, but to a lesser extent since the tube is somewhat cooler than tube 310.

In the present system, the heater operates at a higher temperature than can usually be expected in similar systems, such as that described in the Applicant's previous patents. A hot-spot, well in excess of 640° C., occurs along the tube 310 approximately 1.5 m from the burner 364 for a distance of approximately 1 m. The heat emitted at this hot-spot would ordinarily cause damage and distortion to the aluminium reflector 316 above the tube 310 in that region, particularly when the heater system is in operation for long periods.

Figure 29:
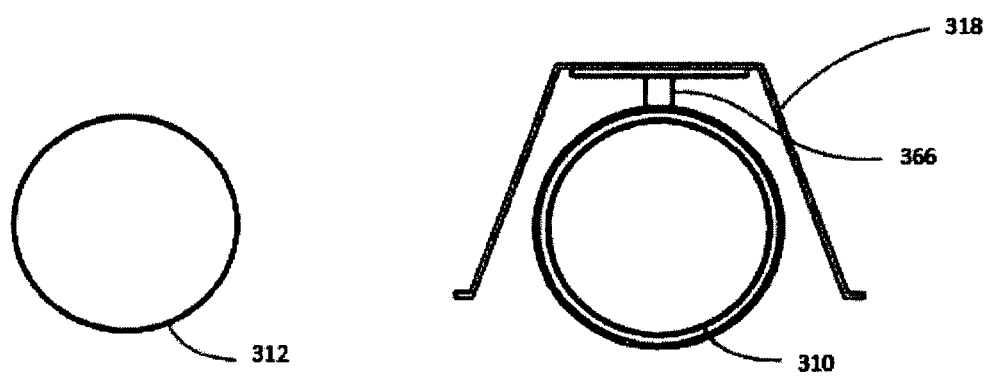
FIG. 29 is the view of FIG. 24 showing the deflector assembly.

To prevent such distortion, then housing 314 includes a deflector assembly 318 located above the tube 310 extending along the length of the hot-spot region. The deflector assembly 318 is best shown in FIG. 29. Here, it can be seen that a "T-shaped" mounting bracket 366 is secured to the top side of the tube 310 to extend upwardly therefrom. Several mounting brackets 366 are located at spaced intervals along the tube in the hot-spot region to allow a stainless steel deflector 318 to extend along the tube 310 across the hot-spot region, As can be seen in FIG. 9, the deflector 318 comprises two adjacent heat dissipation profiled panels of stainless steel, each of around 2.2 m in length.

The deflectors 318 act to absorb and dissipate the radiant heat emitted from the tube 310, and particularly its top surface, over the hot-spot region to deflect the radiant heat from reflector 316 in that region, thus preventing the intense heat from directly reaching the reflector 316. The deflectors 318 are profiled so as to have a generally horizontal top surface 368 (to cover the top surface of the tube 310) and two divergent downwardly extending surfaces (to cover the side surfaces of the tube 310 thereby to prevent intense radiant heat from directly reaching the adjacent cooler tube 312 and the reflector linking wall 356.

The presence of the deflector assembly 318 has been found to increase the overall efficiency of the heating system whilst preventing damage and distortion to parts of the housing 314.

The tubes 310, 312 are supported within the housing by tube-supporting cables as detailed in Applicants earlier U.S. Pat. No. 6,138,662 which is incorporated herein by reference.

It will be understood, that the various embodiments described herein have been described by way of example only and that modifications may be made thereto without departing from the spirit and scope of the present invention as defined in the accompanying claims.

The invention claimed is:

1. A method of heating and ventilating an enclosed area comprising a floor arranged as a number of floor zones, the method comprising:
providing a radiant heater spaced above each floor zone so as in use to direct heat downwards towards the floor;
providing a ventilating air inlet spaced above at least part of each floor zone, the air inlet being at the same level as, or closer to, the floor than the radiant heater, the air inlet being arranged in use to draw-in a controllable quantity of air from outside of the enclosed area;
providing a ventilating air outlet spaced above at least part of each floor zone, the air outlet being spaced further from the floor than the radiant heater and air inlet, the air outlet being arranged in use to extract a controllable quantity of air from inside of the enclosed area;
wherein the method further comprises, for each floor zone, independently controlling the quantity of air being drawn in and extracted from the floor zone based on a sensed temperature inside the floor zone and a sensed temperature outside the enclosed area;
wherein the method further comprises, operating automatically by sensing the difference in inside and outside temperature, and dependent on a required pressurization, increases and decreases the throughput of the inlet(s) and outlet(s) accordingly; and
providing a pollution sensor within each floor zone; and for each floor zone, independently controlling the quantity of air being drawn in and extracted from the floor zone based on a signal from the pollution sensor within the floor zone.

2. Apparatus for controlling heating and ventilation of an enclosed area comprising a plurality of floor zones, the apparatus comprising:
for each floor zone:
a radiant heater spaced above each floor zone so as in use to direct heat downwards towards the floor;
a ventilating air inlet spaced above at least part of each floor zone, the air inlet being at the same level as, or closer to, the floor than the radiant heater, the air inlet being arranged in use to draw-in a controllable quantity of air from outside of the enclosed area;
a ventilating air outlet spaced above at least part of each floor zone, the air outlet being spaced further from the floor than the radiant heater and air inlet, the air outlet being arranged in use to extract a controllable quantity of air from inside of the enclosed area;
a computer control system, configured in use to independently control, for each floor zone, the quantity of air being drawn in and extracted from the floor zone based on a sensed temperature inside the floor zone and a sensed temperature outside the enclosed area;
wherein the computer control system operates automatically by sensing the difference in inside and outside temperature, and dependent on a required pressurization, increases and decreases the throughput of the inlet(s) and outlet(s) accordingly; and
a pollution sensor positioned within each floor zone, wherein the computer control system is further configured in use to independently control, for each floor zone, the quantity of air being drawn in and extracted from the floor zone based on a signal from the pollution sensor within the floor zone.

3. Apparatus as claimed in claim 2 wherein the computer control system operates under computer control of software on non-transient computer memory.

4. Apparatus as claimed in claim 2 wherein the radiant heater is a tube radiant heater.

5. Apparatus as claimed in claim 4 wherein the tube radiant heater is a U-tube radiant heater which includes a burner and a diverting baffle located adjacent the burner and operable to divert combusting flames produced within the burner from the top to the bottom of the tube and vice versa.

6. Apparatus as claimed in claim 2, wherein the computer system is configured to independently control the radiant heater spaced above each floor zone based on feedback received from at least one temperature sensor.

7. The method of claim 1, further comprising independent controlling the radiant heater spaced above each floor zone based on feedback received from at least one temperature sensor.

* * * * *